United States Patent [19]

Lautenschläger

[11] Patent Number: 4,779,999
[45] Date of Patent: Oct. 25, 1988

[54] DRAWER GUIDE

[75] Inventor: Horst Lautenschläger, Reinheim, Fed. Rep. of Germany

[73] Assignee: Karl Lautenschläger GmbH & Co. KG, Reinheim, Fed. Rep. of Germany

[21] Appl. No.: 148,988

[22] Filed: Jan. 27, 1988

[30] Foreign Application Priority Data

Jan. 27, 1987 [DE] Fed. Rep. of Germany ....... 3702238

[51] Int. Cl.$^4$ ..................... F16C 19/49; F16C 29/12; A47B 88/14
[52] U.S. Cl. ................................. 384/18; 312/341 R; 384/19; 384/48; 384/57
[58] Field of Search ....................... 384/18, 19, 23, 34, 384/38, 47–50, 55–57; 312/341 R

[56] References Cited

U.S. PATENT DOCUMENTS 4,511,187  4/1985  Rees ..................................... 384/18
4,606,588  8/1986  Koch .................................. 384/18 X
4,653,821  3/1987  Faust ................................. 384/18 X Primary Examiner—Stanley N. Gilreath
Assistant Examiner—Thomas R. Hannon

[57] ABSTRACT

In a drawer guide with a guide rail to be fastened to the wall of a cabinet, the guide rail enters from below into a corresponding tubular runner rail of an open-bottomed rectangular or square cross section which is to be fastened removably to the drawer, and which contains in its interior races for rolling bodies held in an elongated cage. The rolling bodies can roll on the races of the guide rail on the one hand and on races formed by associated areas of the inner surface of the runner rail and thus permit a longitudinal movement of the runner rail relative to the guide rail, the rolling bodies that serve to accommodate the weight load being formed by a series of rollers with their horizontal axes disposed athwart the direction of drawer movement and the rolling bodies that serve for lateral guidance and stabilization being formed by two rows of balls disposed at a different level than the rollers, one on each side of the guide rail. The race provided for the rollers on the guide rail has a convexly curved cross section in order thus to permit the runner rail to be canted relative to the part of the guide rail provided in its interior.

6 Claims, 2 Drawing Sheets

DRAWER GUIDE

BACKGROUND OF THE INVENTION

The invention relates to a drawer guide having a guide rail to be fastened to the wall of a cabinet carcase and reaching from below into a corresponding runner rail which is square or rectangular in cross section and open at the bottom and can be fastened removably to the drawer. In the interior of the runner rail are races on which rolling bearings held in an elongated cage can roll on the races of the guide rail on the one hand and on races formed by associated areas of the inner surface of the runner rail on the other, thus permitting a longitudinal displacement of the runner rail relative to the guide rail. The rolling bodies serving to bear the weight load are formed by a row of rollers disposed one beside the other with their horizontal axes athwart the direction of drawer movement, and the rolling bodies serving for lateral guidance and stabilization are formed by two rows of balls vertically offset from the rollers and provided on opposite sides of the guide rail.

On the basis of the great number of rolling bodies in the form of balls and rollers which are spaced apart not only in the direction of drawer movement but also at right angles thereto, drawer guides of this kind have the additional advantage, besides easy running and great strength, that they have a relatively high transverse stability even in the fully drawn out state. Therefore a drawer mounted on them in a cabinet will have no great amount of free play in the horizontal transverse direction. For mounting drawers in high-quality furniture, therefore, drawer guides of this kind are used to an increasing extent. Precisely this transverse stability, however, can be a problem, when a drawer to be mounted in a cabinet on such a guide does not fit widthwise precisely into the interior of the cabinet, i.e., is slightly too narrow or too wide transversely of the direction of drawer movement, or if the originally correct dimensions of the drawer and/or of the cabinet have changed due to ambient influences—e.g., warping due to moisture or the like.

On the other hand it is the purpose of the invention to improve the known drawer guides such that they will permit an equalization at least of slight departures of the transverse dimensions from the required dimensions of a drawer relative to the corresponding cabinet, without the need for providing special components, such as shims or the like, to compensate for the difference.

SUMMARY OF THE INVENTION

Setting out from a drawer guide of the kind described above, this purpose is accomplished according to the invention in that the path provided on the guide rail for the roller has a convexly curved cross section. In this manner it is possible for the runner rail to twist slightly relative to the part of the guide rail which is situated in its interior and is provided with the roller paths while the rollers bearing the actual weight load of the drawer shift laterally relative to the convex race. As a result of the convex curvature of the roller race on the guide rail, no marked change in the level of the drawer occurs. Only a certain very slight resilient flexing of the runner rail and/or a certain resilient flexing of the guide rail in the area situated outside of the runner rail is conceivable, although any occurrence of transverse play on the drawer in the fully extracted position is prevented without resulting in any marked difficulty of access to the drawer guide. Since the described twisting of the runner rail and the resilient deformations of the runner rail and/or of the guide rail occur in each case on the two drawer guides that are provided on opposite sides of the drawer, only half of the departure from the required cross-sectional dimension has to be compensated, so that the resulting changes of position or resilient changes of the shape are relatively slight.

The paths for the balls can best have a concave cross section, whose radius is slightly greater than the radius of the corresponding balls.

The circumferential surfaces of the rolls are still cylindrical at least over a portion of their length measured in the direction of the center axis of the rollers, so that in the cylndrical area they have a linear support on the race on the runner rail.

If the rollers have a cylindrical circumference over their entire length, the support on the associated roller race on the guide rail is essentially punctiform, so that a reduced carrying capacity or increased wear of the race in the area of contact with the rolls might result in comparison to the flat guide rail roller race of the known drawer guides. In the case of drawer guides which are intended for greater weight loads, it can therefore be desirable to modify the roller such that they will have in a middle area a substantially concavely curved circumferential surface cross section corresponding to the convex cross section of the guide rail race. Thus the contact of the rollers with the race on the guide rail will take place along a matching concavely curved line, so that the stresses between the guide rail roller race and the roller are correspondingly reduced. On the roller race of the runner rail the rollers thus configured are then supported each on the cylindrical circumferential sections adjoining the concave central area on both sides, so that here a weight transfer takes place through two linear areas spaced apart from one another. The length of the middle portion of concave cross section relative to the two adjoining cylindrical outer portions of the roller can then easily be optimized with regard to the stresses.

BRIEF DESCRIPTION OF THE DRAWING

The invention will be further explained in the following description of an embodiment in conjunction with the drawing, wherein.

DESCRIPTION OF PREFERED EMBODIMENT

Figure 1:
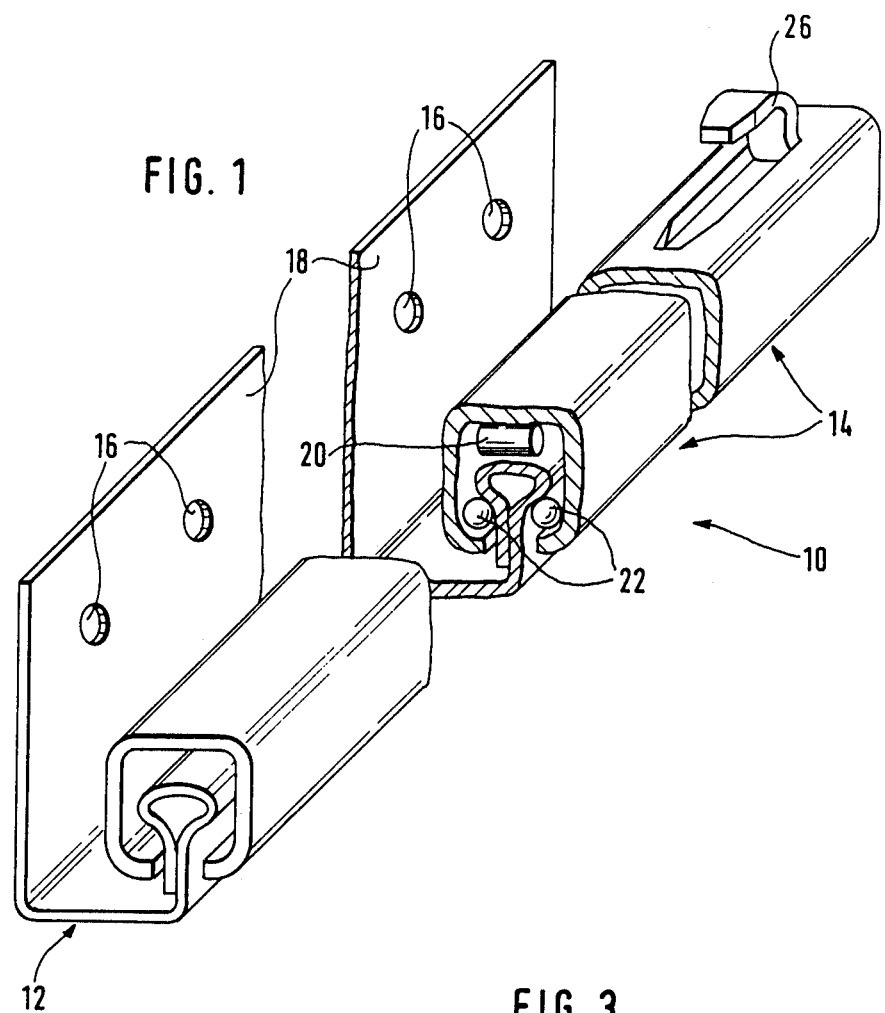
FIG. 1 is a perspective view of a drawer guide according to the invention, parts of the runner rail and guide rail being shown cut away, FIGS. 2a, b and c are cross-sectional views through the drawer guide according to FIG. 1, tken transversely of the direction of drawer movement, FIG. 2a representing the normal installation and FIGS. 2b and 2c the installation in which the dimensions of the drawer differ from the normal relative to the clear internal width of the cabinet carcase.

In FIG. 1 is shown a drawer guide of the kind herein concerned, designated as a whole by 10, which has a guide rail 12 to be attached to a side wall, not shown, of a cabinet carcase, and a runner rail 14 disposed for longitudinal displacement on the guide rail and fastened to a drawer which also is not represented. The guide rail 12 is in the case represented a channel formed from sheet metal whose one limb forms a mounting plate 18 provided with bores 16 for mounting screws, which can be fastened with screws to the inner side of the cabinet side wall, while the second limb is rolled such that within the runner rail 14 to be described further below, it has races running parallel to and at a distance from the mounting plate 18 for rolling bodies in the form of cylndrical rollers 20 rolling on an upper race—in the case represented—and two rows of balls 22 rolling in two hollowed races horizontally spaced apart. The rollers 20 and the balls 22 are held in their mutual association and alignment by an appropriately shaped cage 24 (FIGS. 2a to 2c) of plastic. The runner rail 14 in turn is configured as a channel provided on the bottom with a slot for accommodating the limb of the guide rail 12 which is provided with the races, and is of such a cross-sectional shape that the rollers 20 and the balls 22 are loosely clutched so that the inner surfaces of the runner rail 14 likewise serve as races.

The runner rail 14 is fastened to the drawer in a known manner underneath the drawer bottom and adjacent the inner surface of the drawer side wall projecting downward beyond the drawer bottom; for this purpose a lug (not shown) can be provided which projects into the interstice between the runner rail 14 and the mounting plate 18 of the guide rail and has an upwardly projecting pin which can be forced into an associated bore in the downwardly facing edge of the drawer side wall. At the rearward, i.e., cabinet-interior end, the runner rail extends slightly beyond the back wall of the associated drawer into the cabinet interior where it has a mounting hook 26 which is composed of a tongue raised at first upwardly out of the upper horizontal wall of the runner rail 14 and then bent forward at right angles, i.e, so as to point outwardly from the cabinet interior. The horizontal limb of the hook 26 is normally pushed into a bore in the back wall of the corresponding drawer.

To the extent described thus far, the drawer guide 10 is known and it can be concluded that drawer guides of the kind described, on account of the three-point arrangement of the rolling bodies in the form of the rollers 20 and the balls 22 displaceably held on the guide rail 12 will not only run easily and withstand heavy loading, but will have a high transverse stability even in the fully outdrawn position, so that drawers mounted in a cabinet with a pair of such drawer guides will have no marked horizontal free play even in the fully extended state.

Figure 2C:
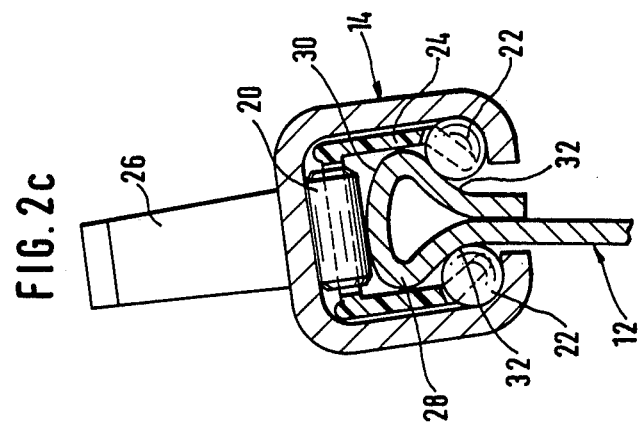
Figure 2A:
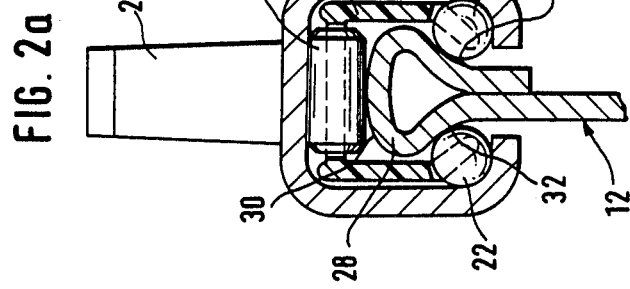
Figure 2B:
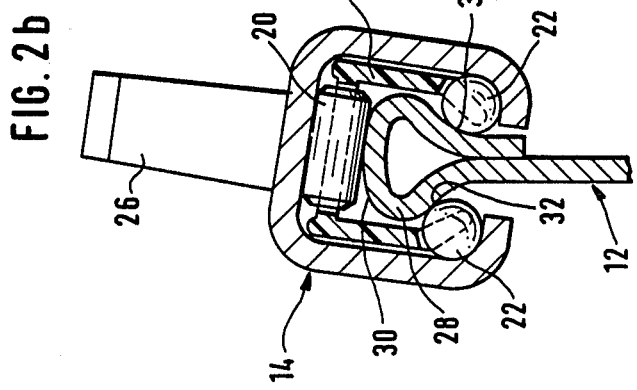

When, however, the drawer guides have no free play and it is assumed that the guide rail 12 is fixedly screwed to the cabinet side wall and the runner rail 14 is fastened as rigidly as possible by means of the above-mentioned pin and the hook 26, it will be necessary to have a relatively precise coordination of the horizontal transverse dimensions of the drawer with the clear horizontal width measured between the inner surfaces of the side walls of the cabinet, because if they are not precisely coordinated the drawer guide would not be installable or at least not without the aid of spacing means or shims to equalize the dimensional errors. Slight departures from the specified dimensions, however, can occur on the one hand due to manufacturing inaccuracies and on the other hand due to changes of the originally correct dimensions by working the material of the cabinet or drawer by drying out or by the absorption of atmospheric humidity. The drawer guide 10 is therefore modified in comparison with the known drawer guides of the kind described herein such that the runner rail 14 can shift from the normal position shown in FIG. 2a relative to the guide rail 12 in the manner represented in FIGS. 2b and 2c, without thereby resulting in a reduction of the transverse stability in the fully outdrawn position. For this purpose the shaped marginal portion 28 of the guide rail provided with the spatially offset races created by shaping the free margin of the second limb of the guide rail 12 is shaped such that the upper race 30 supporting the rows of rollers 20 is not planar but has the convex curvature shown in FIGS. 2a to 2c, so that the rocking or tilting of the runner rail 14 relative to the guide rail 12 as shown in FIGS. 2b and 2c is possible. The races 32 for the balls 22, which are formed on both sides under the race 30 in the marginal area 28 have a hollowed or concave cross section, although the radius of the hollow is greater than the radius of the balls 22, at least in the areas adjoining the race area over which the balls 22 run laterally when the runner rail and guide rail are in normal alignment. Therefore it is possible that the balls 22, in the event of the tilting of the runner rail 14 relative to the guide rail as mentioned and as represented in the drawings, can shift out of the normal alignment with its races 32, shown in FIG. 2a into the laterally adjoining areas. It can furthermore also be seen from the drawing FIG. 2 that the hook 26 fixing the one end of the runner rail 14 to the drawer is laterally offset corresponding to the tilting movement of the runner rail so that, therefore, to this extent a changed position of the runner rail with respect to the bore in the drawer that accommodates the hook 26 results if the runner rail assumes one of the canted positions represented. If now care is taken to see that the front fastening of the runner rail 14 to the drawer undergoes a similar shift of the runner rail relative to the actual point of fastening to the drawer when it tilts, it is clear that horizontal differences of the transverse dimensions of the drawer and cabinet wall can be compensated by canting the runner rail 14 on the marginal area 28 of the guide rail 12. The above-described fastening of the front part of the runner rail to the drawer by means of a laterally projecting tongue having an upwardly projecting pin likewise permits a canting of the runner rail if the tongue is made sufficiently resilient.

In the embodiment of the drawer guide 10 described up to this point, the rollers 20 transferring the weight of the drawer from the runner rail to the guide rail 12 are in the form of rollers having a cylindrical periphery. Since the associated race 30, in contrast to the flat-surfaced race of the known drawer guides, is convexly curved in the transverse direction, the rollers 20 no longer are supported on the race 30 in a linear area running over their entire length but in a punctiform area concentrated on the middle area, which positively results in an increase of the stresses resulting from the transfer of weight between the circumferences of the rollers and the race 30. To prevent a reduced carrying capacity or life of the drawer guide resulting therefrom, either materials capable of withstanding greater loads can be provided for the rollers and/or the guide rail, or the surfaces rolling on one another can be given greater capacity to withstand stress, for example by hardening. It is also possible to increase the number of rollers 20 that are provided.

Figure 3:
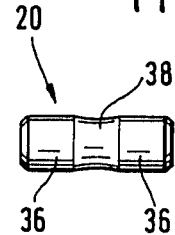
FIG. 3 is a view of a roller which can be used advantageously in conjunction with the drawer guide according to the invention.

In FIG. 3 is shown a modified roller 20' having better load carrying ability than the rollers 20 of cylindrical circumferential surface. The circumferential surface of this roller 20' is divided into three successive portions, of which the two outer circumferential areas 36 again have the cylindrical shape, while the middle portion 38 has a cross section that is concavely curved to complement the convexly curved cross section of the race 30, so that the bearing area of the roller 20' on the race 30 is increased to the width of the area 38, with a corresponding reduction of the transferred stresses. The supporting of the roller 20' on the corresponding race of the runner rail 14 takes place, in contrast, in the area of the outer cylindrical areas 36, i.e., also with a linear contact. By an optimation of the widths of the areas 36 and 38, the carrying capacity of the roller 20 can be greatly increased above the carrying capacity of the purely cylindrical rollers 20, while retaining the possibility of the canting or tilting of the runner rail 14 on the guide rail 12.

I claim:

1. A guide for a drawer of a cabinet, comprising:

an elongated runner rail to be fastened, removably to the drawer; said runner rail having a hollow interior profile of square or rectangular cross section and a longitudinal slot;

an elongated guide rail to be fastened to a carcase wall of the cabinet and having a portion extending through the slot into said interior profile;

associated areas of said guide rail portion and of said runner rail interior profile defining first and second races; and an elongated cage having mounted therein a row of weight bearing rollers disposed successively in longitudinal direction of said rails and rolling on said first races; said rollers having axes of rotation extending athwart the direction of withdrawal of the drawer from the cabinet; said elongated cage also having mounted therein two rows of balls respectively located on opposite sides of said guide rail portion and at a different height than said rollers and rolling on said second races;

said first race on said guide rail being convexly curved.

2. A guide according to claim 1, wherein the second races are concave with a radius of curvature greater than the radius of said balls.

3. A guide according to claim 2, wherein said rollers are cylindrical at least over a portion of their length.

4. A guide according to claim 3, wherein said rollers have a central, concavely curved circumferential area matching the convexly curved first race of said guide rail.

5. A guide according to claim 1, wherein said rollers are cylindrical at least over a portion of their length.

6. A guide according to claim 5, wherein said rollers have a central, concavely curved circumferential area matching the convexly curved first race of said guide rail.

* * * * *